(12) United States Patent
Valva et al.

(10) Patent No.: US 10,400,631 B2
(45) Date of Patent: Sep. 3, 2019

(54) LUBRICATION OF JOURNAL BEARING DURING CLOCKWISE AND COUNTER-CLOCKWISE ROTATION

(71) Applicant: United Technologies Corporation, Farmington, CT (US)

(72) Inventors: Christopher M. Valva, Manchester, CT (US); Brian P. Cigal, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 706 days.

(21) Appl. No.: 14/905,528

(22) PCT Filed: Jul. 10, 2014

(86) PCT No.: PCT/US2014/046123
§ 371 (c)(1),
(2) Date: Jan. 15, 2016

(87) PCT Pub. No.: WO2015/009535
PCT Pub. Date: Jan. 22, 2015

(65) Prior Publication Data
US 2016/0146048 A1 May 26, 2016

Related U.S. Application Data

(60) Provisional application No. 61/846,280, filed on Jul. 15, 2013.

(51) Int. Cl.
*F01D 25/20* (2006.01)
*F02C 7/36* (2006.01)
(Continued)

(52) U.S. Cl.
CPC ............ *F01D 25/20* (2013.01); *F01M 1/02* (2013.01); *F02C 7/06* (2013.01); *F02C 7/32* (2013.01);
(Continued)

(58) Field of Classification Search
CPC .. F01D 25/20; F05D 2220/32; F05D 2260/98; F01M 1/02; F01M 2001/0207;
(Continued)

(56) References Cited

U.S. PATENT DOCUMENTS 2,860,713 A * 11/1958 Peterson ................ B64D 35/00
192/103 R
5,901,802 A * 5/1999 Sunohara ............ F16H 57/0434
137/512

(Continued)

OTHER PUBLICATIONS

Written Opinion for International Application No. PCT/US2014/046123; dated Oct. 28, 2014.
(Continued)

*Primary Examiner* — Aaron R Eastman
(74) *Attorney, Agent, or Firm* — Cantor Colburn LLP

(57) ABSTRACT

The present disclosure is applicable to all gear trains using a journal bearing as a means of supporting gear shaft rotation. It is related in some embodiments to a system and method for supplying lubricant to the journal bearings of a gear-turbofan engine gear train when the fan rotor is subjected to a wind-milling condition in both directions, either clockwise or counterclockwise.

20 Claims, 5 Drawing Sheets

(51) Int. Cl.
  *F02C 7/32* (2006.01)
  *F16H 57/04* (2010.01)
  *F02C 7/06* (2006.01)
  *F01M 1/02* (2006.01)
  *F16N 13/20* (2006.01)

(52) U.S. Cl.
  CPC ........... *F02C 7/36* (2013.01); *F16H 57/0441* (2013.01); *F16H 57/0479* (2013.01); *F16H 57/0495* (2013.01); *F01M 2001/0207* (2013.01); *F01M 2001/0238* (2013.01); *F01M 2001/0253* (2013.01); *F05D 2220/32* (2013.01); *F05D 2260/98* (2013.01); *F16N 13/20* (2013.01)

(58) Field of Classification Search
  CPC .... F01M 2001/0238; F01M 2001/0253; F02C 7/06; F02C 7/32; F02C 7/36; F16N 13/20; F16H 57/0441; F16H 57/0479; F04D 29/063
  USPC .......................................................... 418/32
  See application file for complete search history.

(56) References Cited

U.S. PATENT DOCUMENTS

| | | | | |
|---|---|---|---|---|
| 7,427,191 | B2* | 9/2008 | Kurata | F04C 2/086 |
| | | | | 418/133 |
| 7,662,059 | B2* | 2/2010 | McCune | F01D 25/20 |
| | | | | 184/27.2 |
| 7,849,668 | B2 | 12/2010 | Sheridan | |
| 8,230,974 | B2* | 7/2012 | Parnin | F01D 25/18 |
| | | | | 184/6.11 |
| 8,307,626 | B2 | 11/2012 | Sheridan | |
| 2007/0289310 | A1* | 12/2007 | Dooley | F01D 15/10 |
| | | | | 60/773 |
| 2008/0047376 | A1* | 2/2008 | Venter | F01D 15/10 |
| | | | | 74/15.2 |

OTHER PUBLICATIONS

International Search Report for International Application No. PCT/US2014/046123; dated Oct. 28, 2014.

* cited by examiner

LUBRICATION OF JOURNAL BEARING DURING CLOCKWISE AND COUNTER-CLOCKWISE ROTATION

CROSS REFERENCE TO RELATED APPLICATION

The present application is related to, claims the priority benefit of U.S. Provisional Patent Application Ser. No. 61/846,280, filed Jul. 15, 2013. The contents of this application is hereby incorporated by reference in its entirety into this disclosure.

TECHNICAL FIELD OF THE DISCLOSURE

The present disclosure is generally related to lubrication of journal bearings and, more specifically, to lubrication of journal bearings during clockwise and counter-clockwise rotation.

BACKGROUND OF THE DISCLOSURE

A gear-turbofan engine consists of an epicyclic gear system coupling the turbine to the fan. In this manner, both the fan and the turbine can operate at each component's own optimum speed. The fan and the turbine may be coupled to one another through a gear train that is supported by a journal bearing system.

During powered operation of the engine, lubricant is delivered to the journal bearings by means of one or multiple oil pumps. This lubricant develops a hydrodynamic film at the journal bearing surface between the gear bore and the journal pin shaft in order to minimize wear as these surfaces move with respect to one another. The oil pump(s) pump lubricant from an oil sump and deliver pressurized oil to the journal bearings. At the journal bearings, oil is squeezed by the rotation of the gears and generates a hydrodynamic film which is necessary to prevent undesirable metal-to-metal contact between the gear bore and the journal pin shaft.

During the non-operating condition of the engine, the oil pump(s) stop running. If no lubricant is delivered to the journal bearings, the gear bore is in direct contact with the journal pin shaft under the effect of gravity. Under this circumstance, any relative motion between the gear bore inner surface and the journal pin outer surface can cause premature wear and undesirable damage to these surfaces. An auxiliary oil pump is therefore sometimes provided that is mechanically coupled to the epi-cyclic gear system so that the auxiliary oil pump will rotate with rotation of the engine.

In the engine non-operating mode, rotation of the rotor, and hence the gears, can be caused by wind-milling, a phenomenon resulting from ambient wind blowing through the engine, causing the turbofan engine to rotate due to forces imparted by the wind to engine surfaces. Depending on the wind direction, either toward the fan blade through the nacelle inlet or toward the turbine blade through the exhaust duct, the rotor can rotate in either direction, clockwise or counter-clockwise with respect to the pilot view. Rotation of the rotor during the engine non-operating mode may be caused by other means, such as manual rotation to name just one non-limiting example. Any rotation of the rotor during the engine non-operating mode, no matter what is the cause of the rotation, is referred to herein for convenience as "wind-milling".

Currently, there are no known means to deliver oil effectively to the journal bearings when the wind-milling phenomenon occurs in both rotational directions. The present disclosure is related to a system and method of supplying lubricant to the journal bearings of a gear-turbofan engine operating with a gear train when the rotor is subjected to a wind-milling condition in both directions, either clockwise or counter-clockwise. The presently disclosed embodiments will also find applicability in other applications where lubrication is to be applied when a gear train is operating in either clockwise or counter-clockwise directions.

SUMMARY OF THE DISCLOSURE

In one embodiment, a gear system is disclosed, comprising: a shaft; and a lubrication system, the lubrication system comprising: a gear including a gear bearing surface, the gear operatively driven by the shaft; and a pump operatively driven by the gear, the pump including a first pump port and a second pump port; wherein rotation of the gear below a predetermined operational speed range in either direction causes the pump to transfer lubricant to the gear bearing surface.

In another embodiment, a turbofan engine is disclosed, comprising: a fan; a fan shaft operably coupled to the fan; a gear including a gear bearing surface, the gear operatively driven by the fan shaft; and a pump operatively driven by the gear, the pump including a first pump port and a second pump port; wherein rotation of the fan shaft in either direction causes the pump to transfer lubricant to the gear bearing surface when the engine is in a non-operational mode.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The present disclosure is applicable to all gear trains using a journal bearing as a means of supporting gear shaft rotation. In an embodiment, lubricant is supplied to the journal bearings of a gear-turbofan engine gear train when the fan rotor is subjected to a wind-milling condition in both directions, either clockwise or counter-clockwise.

Figure 1:
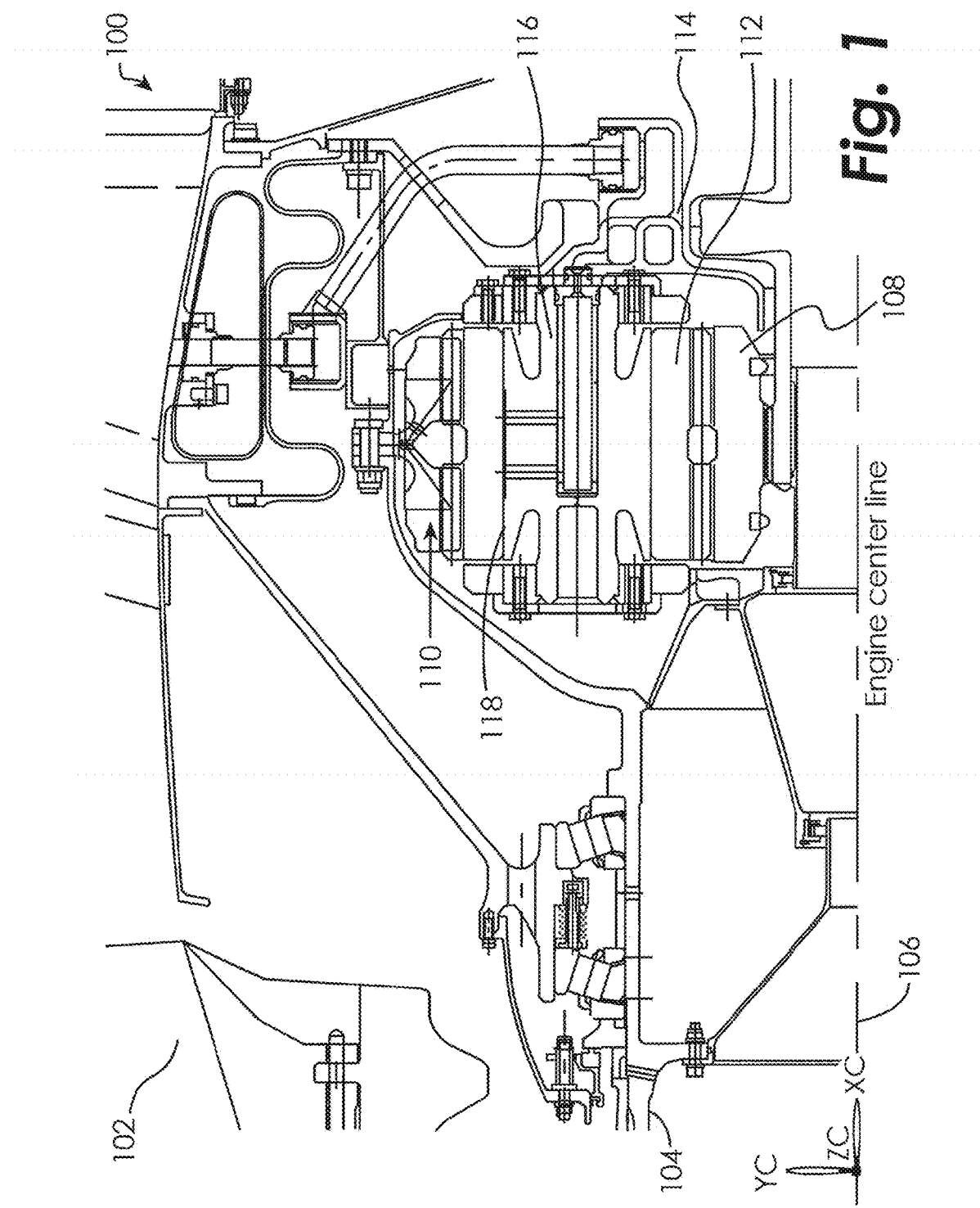
FIG. 1 is a partial cross-section of a gear-turbofan engine according to an embodiment.

One embodiment of an engine, such as, for example, a gear-turbofan engine, is shown in partial cross-section in FIG. 1 and indicated generally at 100. The engine 100 comprises a PW 1000G Gear Turbofan Series engine manufactured by Pratt & Whitney®. A fan blade 102 is attached to a fan shaft 104 which rotates about an engine centerline 106. An epicyclic gear-train includes a sun gear 108, a ring gear 110, and a set of planetary gears 112 supported by a carrier frame 114. Each planetary gear 112 is supported by a journal bearing system. The planetary gear 112 rotates around a journal bearing 116 (having a journal bearing surface 118) that is supported by the carrier frame 114 at its two ends as shown in FIG. 1.

During powered operation of the engine 100, the engine operates within a design operational speed range, and lubricant is delivered to the journal bearings 116 by means of one or multiple oil pumps (not shown). Although the embodiments disclosed herein make reference to oil as the lubricant, those skilled in the art will recognize that any appropriate lubricant may be used, whether naturally occurring or synthetic. At the journal bearings 116, oil is squeezed by the rotation of the planetary gears 112 and generates a hydrodynamic film at the journal bearing surface 118. The hydrodynamic film is necessary to prevent undesirable metal-to-metal contact between the planetary gear 112 and the journal bearing 116. As explained above, during the non-operating condition of the engine 100, these oil pump(s) do not operate. If no lubricant is delivered to the journal bearings 116, the planetary gear 112 may come into direct contact with the journal bearing 116. Under this circumstance, any relative motion between the planetary gear 112 inner surface and the journal bearing surface 118 may cause premature wear and undesirable damage to either or both of these surfaces. An auxiliary oil pump is therefore sometimes provided that is mechanically coupled to the epi-cyclic gear system so that the auxiliary oil pump will rotate with the rotation of the engine.

When the engine 100 is in the non-operating mode, wind-milling, which is a phenomenon resulting from ambient wind blowing through the engine 100, may rotate the rotor below the operational speed range, causing the planetary gears 112 to rotate. Depending on the wind direction, either aft toward the fan blade 102 through the nacelle inlet or forward toward the turbine blade through the exhaust duct, the rotor can rotate in either the clockwise or counter-clockwise direction. When the wind blows toward the fan blade 102 through the nacelle, the rotor rotates in the normal operating direction (i.e., in the clockwise direction). When the wind blows toward the turbine blade through the exhaust duct of the engine, the rotor rotates in the opposite direction of the normal operating condition (i.e., in the counter-clockwise direction).

Figure 2:
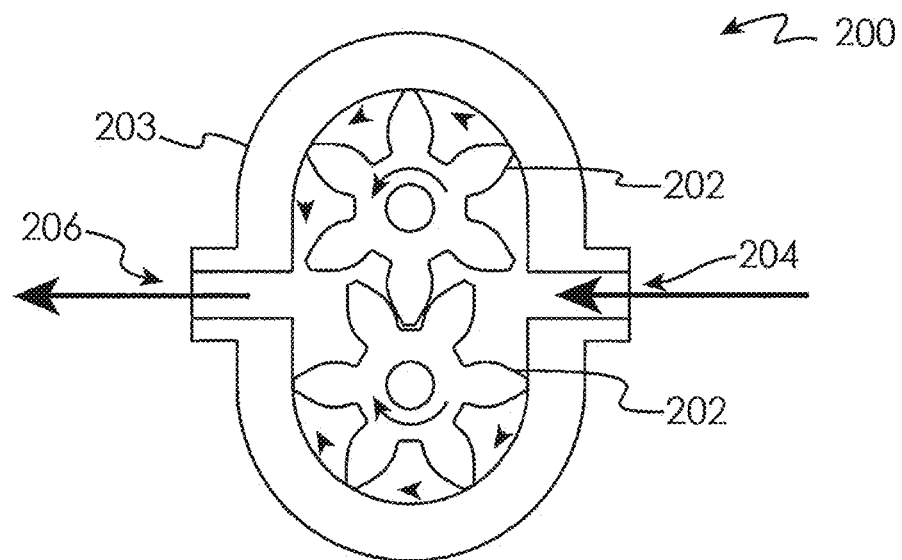
FIG. 2 is a schematic cross-section of a pump according to an embodiment.

An exemplary auxiliary oil pump comprises a positive displacement pump as schematically illustrated in FIG. 2 and indicated generally at 200. The pump 200 includes an internal gear system 202 that is driven by rotation of the engine rotor. The gear system 202 is contained within a pump housing 203. A first pump port 204 is formed in the pump housing 203 and is operatively connected to a supply of lubricant (not shown), such as from an auxiliary lubricant tank or from an engine lubricant sump to name two non-limiting examples. A second pump port 206 is formed in the pump housing 203 and is operatively coupled to supply line(s) (not shown) providing lubricant to the journal bearings 116. FIG. 2 illustrates operation of the pump 200 during rotation of the engine in the normal operational direction during wind-milling, which will cause rotation of the gear system 202 in the direction indicated. When the gear system 202 operates in the direction indicated in FIG. 2, suction will be created at first pump port 204 and lubricant will be drawn into the pump 200. Additionally, lubricant under pressure will be expelled at the second pump port 206 so that it may be delivered to the journal bearings 116.

Figure 3:
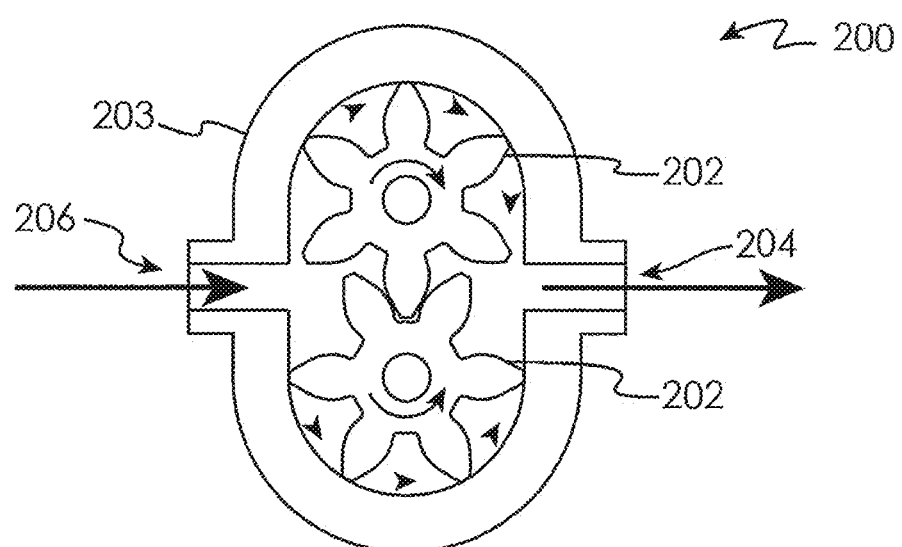
FIG. 3 is a schematic cross-section of a pump according to an embodiment.

However, the pump 200 will not supply lubricant to the journal bearings 116 when the engine rotates counter to the normal operational direction during wind-milling, which will cause rotation of the gear system 202 in the direction indicated in FIG. 3. When the gear system 202 operates in the direction indicated in FIG. 3, suction will be created at second pump port 206 and the pump 200 will attempt to draw lubricant in from the second pump port 206. Additionally, the pump 200 will create pressure at the first pump port 204, causing any lubricant that the pump 200 is able to obtain at the second pump port 206 to be returned through the first pump port 204 to the lubricant supply. Therefore, during rotation of the engine counter to the normal operational direction during wind-milling, the pump is not supplying lubricant to the journal bearings 116 (FIG. 1). If no lubricant is delivered to the journal bearings 116, the planetary gear 112 may come into direct contact with the journal bearing 116. Under this circumstance, any relative motion between the planetary gear 112 inner surface and the journal bearing surface 118 may cause premature wear and undesirable damage to either or both of these surfaces.

Figure 4:
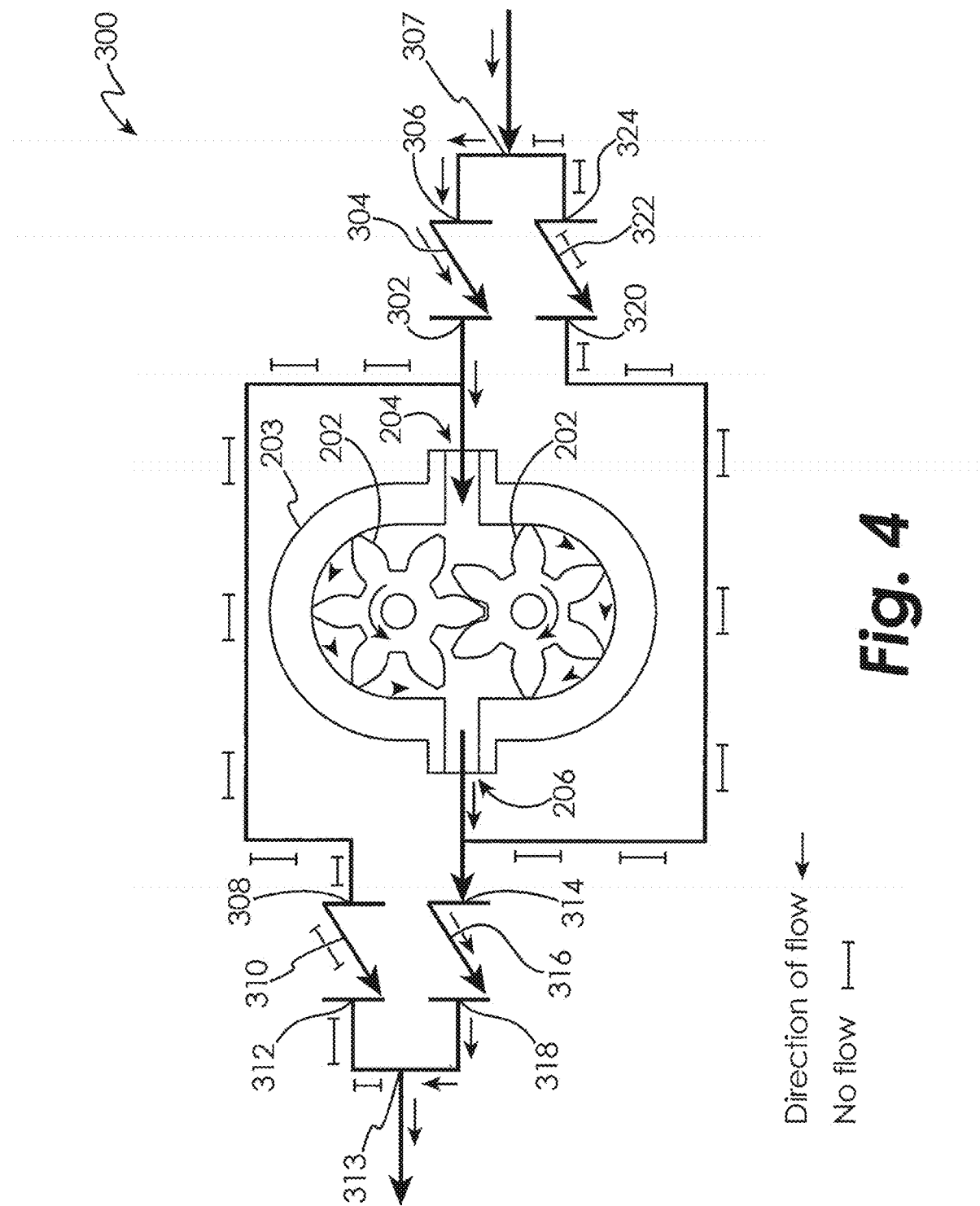
FIG. 4 is a schematic cross-section of a pump according to an embodiment.
Figure 5:
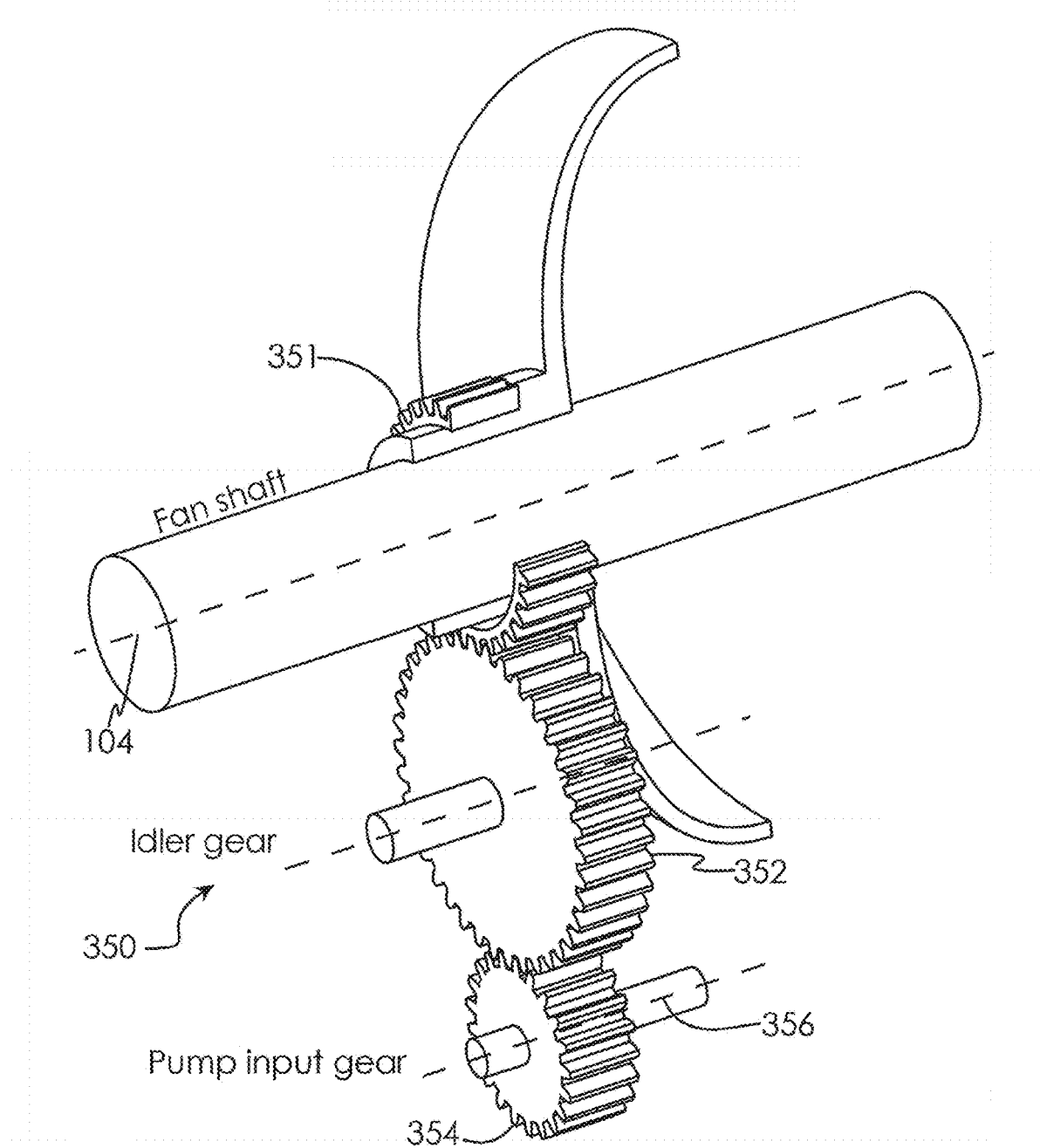
FIG. 5 is a schematic illustration of a gear system according to an embodiment.

Referring now to FIG. 4, a bi-directional auxiliary pump according to an embodiment is schematically illustrated and indicated generally at 300. The rotor speed under a wind-milling condition is a fraction of the engine operational speed range, therefore the bi-directional pump 300 disclosed herein is configured to operate below the operational speed range. The pump 300 will supply lubricant to the journal bearing 116 regardless of which direction the engine rotates. Like the pump 200, the pump 300 comprises an internal gear system 202 that is driven by rotation of the engine. FIG. 5 illustrates in greater detail how the pump 300 is powered by the fan shaft 104. Power is extracted from the fan shaft 104 through a gear train 350 to bring the speed of the bi-directional pump 300 to its optimum operational speed through a chosen gear ratio, as explained below. The engine fan shaft 104 includes a shaft gear 351 that drives an idler gear 352. The idler gear 352 in turns meshes with a driving gear 354 that forms part of the driving mechanism of the pump 300. In one embodiment, the driving gear 354 rotates about the pump rotor centerline 356. The overall gear ratio of the idler gear 352 and driving gear 354 (and any other optional gears that may be used in the gear train) is selected to transition between an expected fan wind-milling speed range, which is much less than the operational speed range of the engine, and the speed at which the pump operates at optimum efficiency. In some embodiments, the pump may be disengaged from the engine fan shaft 104 when the engine is in an operational mode. An operational mode may be indicated by the engine being in a running state and producing power. For example, in one embodiment the pump may be disengaged when an Engine-Start button is activated, indicating that the engine is being placed into a running state, to name just one non-limiting example. An operational mode may also be indicated by the engine operating within a predetermined operational speed range. For example, in one embodiment the pump 300 may be disengaged when it is determined that the engine is not (or soon will not be) below the operational speed range, such as by using a spring mechanism (not shown) reacting to centrifugal force at a pre-determined disengagement speed, to name just one non-limiting example. It will be appreciated from the present disclosure that the means used to disengage the pump when the engine is in a non-operational mode may vary.

The gear system 202 within the pump 300 is contained within a pump housing 203. A first pump port 204 is formed in the pump housing 203 and is operatively connected to a valve outlet 302 of a check valve 304. A valve inlet 306 of check valve 304 is operatively coupled to a pump inlet 307 which is operatively coupled to a supply of lubricant (not shown), such as from an auxiliary lubricant tank or from an engine lubricant sump to name two non-limiting examples. The first pump port 204 is further operatively coupled to a valve inlet 308 of a check valve 310. A valve outlet 312 of check valve 310 is operatively coupled to a pump outlet 313 that is operatively coupled to supply line(s) (not shown) providing lubricant to the journal bearings 116. Check valves 304 and 310 function to allow flow moving in a first direction from their respective valve inlets to their respective valve outlets, while blocking (or substantially blocking) flow moving in a second direction from their respective valve outlets to their respective valve inlets.

A second pump port 206 is formed in the pump housing 203 and is operatively coupled to a valve inlet 314 of a check valve 316. A valve outlet 318 of check valve 316 is operatively coupled to pump outlet 313. The second pump port 206 is further operatively coupled to a valve outlet 320 of a check valve 322. A valve inlet 324 of check valve 322 is operatively coupled to the pump inlet 307. Check valves 316 and 322 function to allow flow moving in a first direction from their respective valve inlets to their respective valve outlets, while blocking (or substantially blocking) flow moving in a second direction from their respective valve outlets to their respective valve inlets.

FIG. 4 illustrates operation of the pump 300 during rotation of the engine in the normal operational direction during wind-milling, which will cause rotation of the gear system 202 in the direction indicated. When the gear system 202 operates in the direction indicated in FIG. 4, suction will be created at first pump port 204 and lubricant will be drawn into the pump 300 through the pump inlet 307 and check valve 304. Additionally, lubricant under pressure will be expelled at the second pump port 206 and will pass through the check valve 316 and the pump outlet 313 so that it may be delivered to the journal bearings 116. The high pressure flow at the second pump port 206 is prevented from reaching the low pressure first pump port 204 by operation of the check valve 322. Similarly, the high pressure flow at the valve outlet 318 of check valve 316 is prevented from reaching the low pressure first pump port 204 by operation of the check valve 310.

Figure 6:
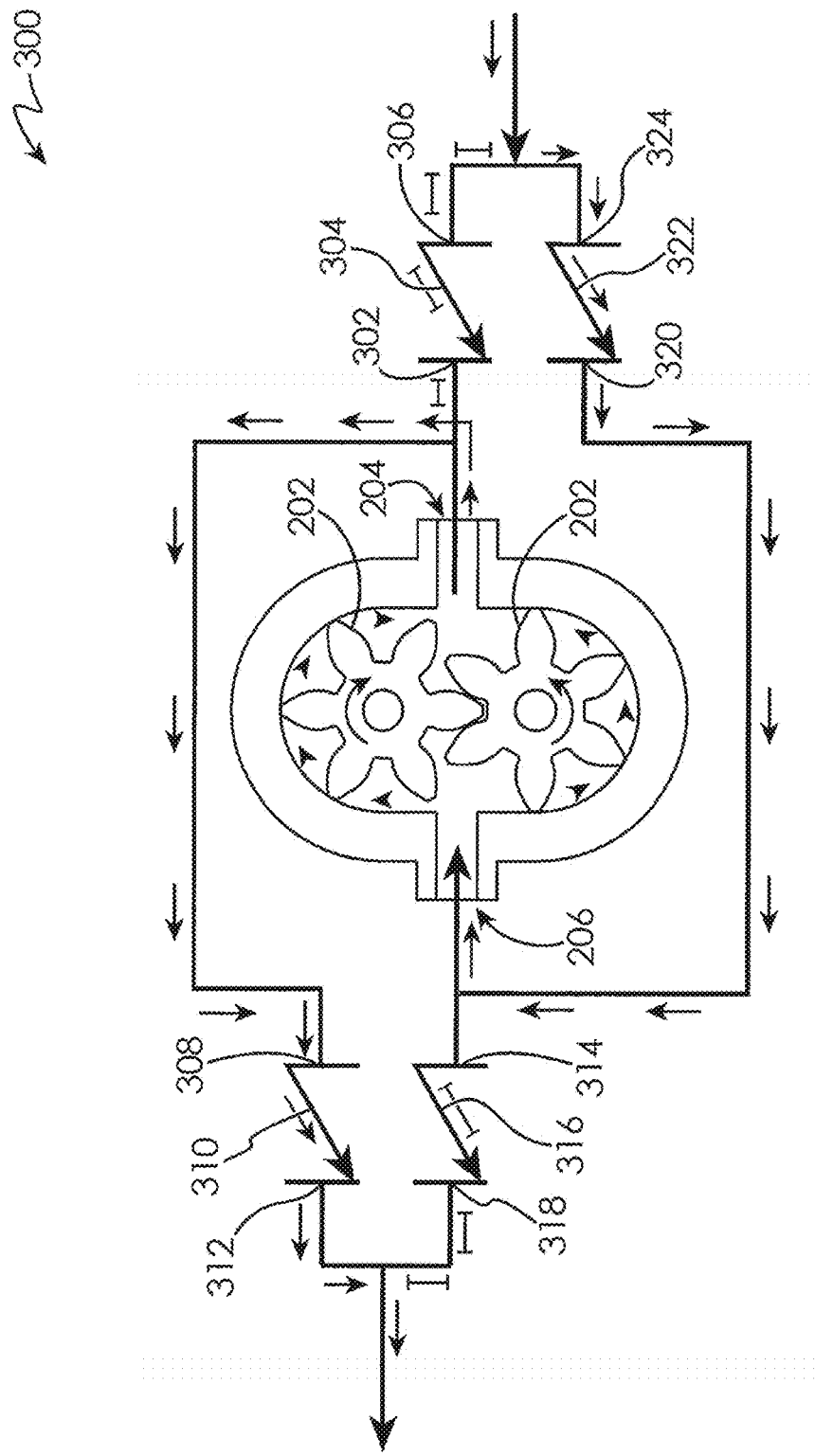
FIG. 6 is a schematic cross-section of a pump according to an embodiment.

FIG. 6 illustrates operation of the pump 300 during rotation of the engine in a direction opposite to the normal operational direction during wind-milling, which will cause rotation of the gear system 202 in the direction indicated. When the gear system 202 operates in the direction indicated in FIG. 6, suction will be created at second pump port 206 and lubricant will be drawn into the pump 300 from pump inlet 307 through the check valve 322. Additionally, lubricant under pressure will be expelled at the first pump port 204 and will pass through the check valve 310 and pump outlet 313 so that it may be delivered to the journal bearings 116. The high pressure flow at the valve outlet 312 of check valve 310 is prevented from reaching the low pressure second pump port 206 by operation of the check valve 316. Similarly, the high pressure flow at the first pump port 204 is prevented from reaching the low pressure second pump port 206 by operation of the check valve 304.

It will be appreciated from the above disclosure that no matter which way the pump 300 is rotated, suction is created at the pump inlet 307 and pressure is created at the pump outlet 313. When used as an auxiliary lubricant pump to supply lubricant to the journal bearings 116 during wind-milling operation of an engine, the pump 300 will supply lubricant regardless of whether the engine is being rotated by wind blowing toward the fan blade 102 through the nacelle, or toward the turbine blade through the exhaust duct of the engine. It will be appreciated by those skilled in the art in view of the present disclosure that the pump 300 may be any kind of positive displacement pump in which changing the direction of rotation also changes the direction of flow of liquid through the pump. For example, the pump 300 may comprise a single-stage or multi-stage gear pump, to name two non-limiting examples. Furthermore, the check valves 304, 310, 316 and 322 may be coupled to the pump 300 using any appropriate external lines. Alternatively, one or more of the check valves 304, 310, 316 and 322 may be formed integrally with the pump housing 203.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A lubrication system for a gear-turbofan engine, the lubrication system comprising:
   a gear including a gear bearing surface, the gear operatively coupled to a shaft; and
   a bi-directional auxiliary pump operatively coupled to the gear, the bi-directional auxiliary pump including a first pump port and a second pump port;
   wherein rotation of the gear below a predetermined operational speed range of the gear-turbofan engine in a first direction causes the bi-directional auxiliary pump to transfer lubricant outwardly from the first pump port to the gear bearing surface and wherein rotation of the gear below the predetermined operational speed range of the gear-turbofan engine in a second direction, which is opposite to the first direction, causes the bi-directional auxiliary pump to transfer lubricant outwardly from the second pump port to the gear bearing surface.

2. The lubrication system of claim 1, wherein the gear comprises:
   an idler gear directly driven by the shaft; and
   a driving gear driven by the idler gear, the driving gear being operatively coupled to the bi-directional auxiliary pump for rotation of the bi-directional auxiliary pump when the driving gear is caused to rotate.

3. The lubrication system of claim 1, wherein the bi-directional auxiliary pump is a positive displacement pump.

4. The lubrication system of claim 3, wherein the positive displacement pump comprises:
   a first plurality of check valves operatively coupled to the first pump port; and a second plurality of check valves operatively coupled to the second pump port.

5. The lubrication system of claim 4, wherein:
the first plurality of check valves comprises:
a first check valve comprising:
a first valve inlet; and
a first valve outlet;
wherein the first valve outlet is operatively coupled to the first pump port; a second check valve comprising:
a second valve inlet; and
a second valve outlet;
wherein the second valve inlet is operatively coupled to the first pump port;
the second plurality of check valves comprises:
a third check valve comprising:
a third valve inlet; and
a third valve outlet;
wherein the third valve inlet is operatively coupled to the second pump port; and
a fourth check valve comprising:
a fourth valve inlet; and
a fourth valve outlet;
wherein the fourth valve outlet is operatively coupled to the second pump port.

6. The lubrication system of claim 5, further comprising:
a pump inlet operatively coupled to the first valve inlet and to the fourth valve inlet; and a pump outlet operatively coupled to the second valve outlet and to the third valve outlet.

7. The lubrication system of claim 4, further comprising:
a pump housing;
wherein the first plurality of check valves and the second plurality of check valves are disposed in the pump housing.

8. The lubrication system of claim 1, wherein the lubricant comprises oil.

9. A turbofan engine, comprising:
a fan;
a fan shaft operably coupled to the fan;
a gear including a gear bearing surface, the gear operatively driven by the fan shaft; and
a bi-directional auxiliary pump operatively driven by the gear, the bi-directional auxiliary pump including a pump inlet and a pump outlet;
wherein rotation of the fan shaft in a first direction when the engine is in a non-operational mode causes the bi-directional auxiliary pump to transfer lubricant to the gear bearing surface by creating pressure at the pump outlet and by creating suction at the pump inlet and wherein rotation of the fan shaft in a second direction, which is opposite to the first direction, when the engine is in a non-operational mode causes the bi-directional auxiliary pump to transfer lubricant to the gear bearing surface by creating pressure at the pump outlet and by creating suction at the pump inlet.

10. The turbofan engine of claim 9, wherein the gear comprises:
an idler gear directly driven by the fan shaft; and
a driving gear driven by the idler gear, the driving gear being operatively coupled to the bi-directional auxiliary pump for rotation of the bi-directional auxiliary pump when the driving gear is caused to rotate.

11. The turbofan engine of claim 9, wherein the bi-directional auxiliary pump further comprises a first pump port and a second pump port and wherein the bi-directional auxiliary pump is a positive displacement pump.

12. The turbofan engine of claim 11, wherein the positive displacement pump comprises:
a first plurality of check valves operatively coupled to the first pump port; and a second plurality of check valves operatively coupled to the second pump port.

13. The turbofan engine of claim 12, wherein:
the first plurality of check valves comprises:
a first check valve comprising:
a first valve inlet; and
a first valve outlet;
wherein the first valve outlet is operatively coupled to the first pump port; a second check valve comprising:
a second valve inlet; and
a second valve outlet;
wherein the second valve inlet is operatively coupled to the first pump port;
wherein the second plurality of check valves comprises:
a third check valve comprising:
a third valve inlet; and
a third valve outlet;
wherein the third valve inlet is operatively coupled to the second pump port; and
a fourth check valve comprising:
a fourth valve inlet; and
a fourth valve outlet;
wherein the fourth valve outlet is operatively coupled to the second pump port.

14. The turbofan engine of claim 13, further comprising:
a pump inlet operatively coupled to the first valve inlet and to the fourth valve inlet; and
a pump outlet operatively coupled to the second valve outlet and to the third valve outlet.

15. The turbofan engine of claim 12, further comprising:
a pump housing;
wherein the first plurality of check valves and the second plurality of check valves are disposed in the pump housing.

16. The turbofan engine of claim 9, wherein the lubricant comprises oil.

17. The turbofan engine of claim 9, wherein the non-operational mode comprises the engine not being in a running state and not producing power.

18. The turbofan engine of claim 9, wherein the non-operational mode comprises the engine not running within a predetermined operational speed range.

19. A method of providing lubricant to a gear bearing surface of a turbofan engine, comprising:
rotating a fan of the turbofan engine in a first direction when the turbofan engine is in a non-operational mode;
pumping lubricant to the gear bearing surface from a first pump port of a bi-directional auxiliary pump operatively coupled to the fan, by creating pressure at a pump outlet of the bi-directional auxiliary pump and by creating suction at a pump inlet of the bi-directional auxiliary pump, when the fan rotates in the first direction when the turbofan engine is in the non-operational mode;
rotating the fan of the turbofan engine in a second direction when the turbofan engine is in the non-operational mode, the second direction being opposite to the first direction; and
pumping lubricant to the gear bearing surface from a second pump port of the bi-directional auxiliary pump, by creating pressure at the pump outlet of the bi-directional auxiliary pump and by creating suction at the pump inlet of the bi-directional auxiliary pump, when the fan rotates in the second direction when the turbofan engine is in the non-operational mode.

20. The method as in claim 19, further comprising:

disengaging the bidirectional auxiliary pump from an engine fan shaft when the engine is in an operational mode.

\* \* \* \* \*